Sept. 8, 1953  F. W. RECKNAGEL  2,651,554
ANTIFRICTION BEARING STRUCTURE
Filed Nov. 30, 1951

INVENTOR
Frederick W. Recknagel
BY
ATTORNEY

Patented Sept. 8, 1953

2,651,554

UNITED STATES PATENT OFFICE 2,651,554

ANTIFRICTION BEARING STRUCTURE

Frederick W. Recknagel, Poughkeepsie, N. Y., assignor to Schatz Manufacturing Company, Poughkeepsie, N. Y., a corporation of New York Application November 30, 1951, Serial No. 259,149

7 Claims. (Cl. 308—196)

This invention relates to anti-friction bearing structures and particularly to the type including a composite race ring made up of a pair of complementary ring members.

An object of the invention is to provide in coaction with the complementary ring members a novel deformable lock ring and related method of deforming it into substantially permanent bonding engagement with the complementary members to unite them as a virtually unitary race ring.

More specifically, the invention contemplates the provision of a lock ring of soft metal and initially shaped with a rim of curved or generally V-shaped contour and adapted to be engaged between opposing recessed surfaces of the complementary ring members and to be deformed by lateral contraction of its rim upon the members being pressed together, such contraction to take place while restraint is placed on the rim against radial departure from the recessed surfaces in the members, so that the metal at the ends of the rim will flow into intimate bonding contact with the recessed surfaces of the members and thereby unite the members in their complementary relation.

Further, the object of the invention is to provide such lock ring with sufficient elasticity to enable it to be sprung into channels or recesses of the complementary members for detachably connecting the members during handling, and the ring also being deformable to effect a permanent connection between the members.

The invention is especially adaptable to a bearing in which the inner ring is the composite ring composed of a pair of complementary members. According to the invention, these members will be formed with internal channels into which the lock ring may be sprung to connect the members detachably in complementary but endwise spaced positions. The lock ring will be initially formed with a rim of dished or generally V-shaped cross-section. Owing to the contour of the rim and the softness of its metal, the pressing of the complementary members together to abut their facing ends will produce transverse contractile deformation of the rim of the lock ring. A suitable pilot or mandrel will be placed in the bores of the complementary members while they are being pressed together so as to restrain collapse of the lock ring during its contraction, with the result that the metal of the rim will be forced to flow into intimate interlocking bonding contact with the walls of the channels in the members so as to effect their permanent connection.

Other objects reside in details of the construction and also will become clear from the following description and claims and from the drawing which shows, by way of example, the preferred form of the invention.

Figure 1:
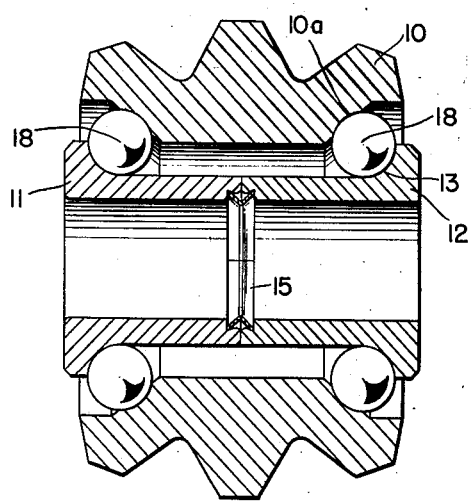
Fig. 1 is a section through the bearing structure showing the complementary race members permanently connected by the lock ring.
Figure 2:
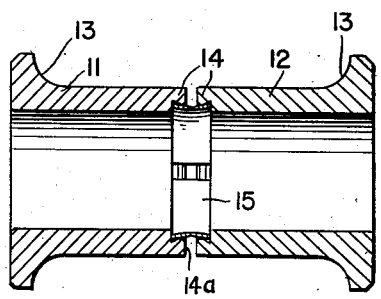
Fig. 2 is a section through the complementary race members showing them detachably connected by the lock ring.
Figure 3:
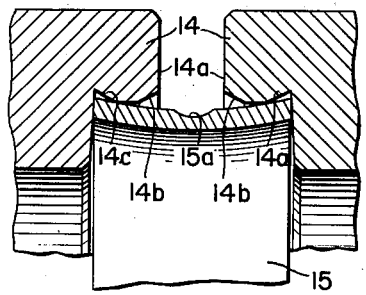
Fig. 3 is a view on a greatly enlarged scale of a fragment of Fig. 2.

In detail, the illustrative bearing structure comprises an outer bearing piece 10 having ball races 10a and shown as a toothed gear element for use in a steering apparatus or the like. The inner bearing piece is the composite ring comprising a pair of complementary ring members 11 and 12. The members 11 and 12 may be identical but not necessarily, each being flanged at one end and formed at the flanged end with a ball race 13. At the opposite, small end, each complementary member is formed with a lip 14 of larger internal diameter than the diameter of the bore of the member. The radially extending outer side of the lip is a flat edge 14a. The lip is chamfered inwardly from the edge 14a to provide a beveled camming edge 14b. Behind the edge 14b, the lip is formed, as shown, with an undercut, internal tapered annular channel or recess 14c, but which could be formed as a radiused groove. A split lock ring 15, constructed according to the invention, is adapted to engage in the recesses 14c of the pair of members 11 and 12 to connect them detachably in complementary but spaced apart position as indicated in Figs. 2 and 3.

The ring 15 is made of soft, ductile metal and its rim is preformed to a dished or concave transverse shape with sides diverging outwardly from a central line of the rim. As shown, there is a thinned or weakened section 15a along this central line of the ring and such weakened section tends to establish a definite line of fold for the ring upon contractile deformation of the ring. If desired, the weakening or thinning of the central section may be omitted and the ring will still be transversely foldable about an approximate central line. The nature of the metal of ring 15 is such that the ring will stay expanded when forced out under pressure but will nevertheless have sufficient elasticity to inherently return to a minimum expanded condition after being compressed to a condition in which its split ends are brought together. Thus, the ring may be cammed, at each side, past beveled edges 14b of the pair of complementary members 11 and 12 and sprung into recesses 14c detachably to connect the members. The transverse span of ring 15, as initially formed, is appreciably greater than twice the length of a lip 14 and such that with the ring detachably connecting members 11, 12, the conforming edges 14a of the members are relatively far apart (see Figs. 2 and 3).

Figure 4:
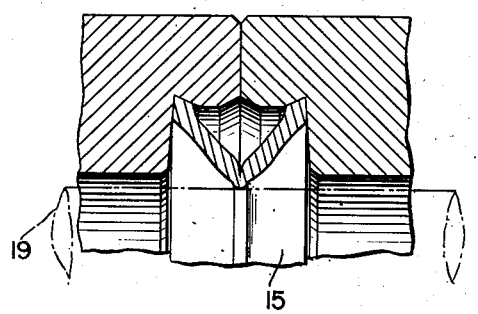
Fig. 4 is a similar view of a fragment of Fig. 1.
Figure 5:
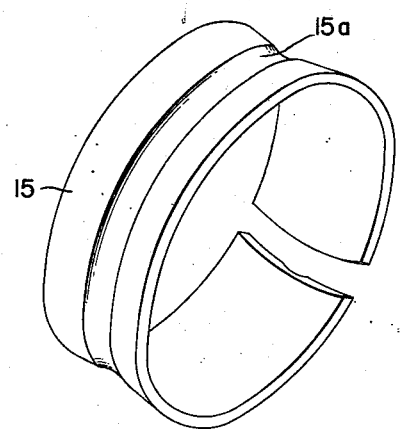
Fig. 5 is a perspective of the lock ring.

In assembling the inner bearing piece, lock ring 15 is sprung into recess 14a of the positioned member 11 or 12. The other complementary member is then pushed against the free edge of ring 15 and edge 14b of the member cams the edge of lock ring 15 past to spring it into recess 14c behind the camming edge. The two inner ring members are thus detachably connected in complementary but spaced apart relationship. To effect substantially permanent connection between members 11 and 12, a mandrel 19 (see Fig. 4) is inserted into the bores of the members and pressure applied to the flanged face of one of the members while the corresponding face of the other member is supported. The members will thus be forcibly pressed together until the flat edges 14a of their smaller ends are in abutment. As the members are pressed together, they effect transverse contractile deformation of the rim of the lock ring 15, with the central section 15a of the ring establishing a line of fold of the diverging sides of the rim. The mandrel 19 prevents collapse of the ring 15 to any appreciable extent into the bores of the members 11 and 12 while the ring is being deformed. Accordingly, the edges of the rim will be forced towards the bottoms of recesses 14c causing the metal to thicken and flow into intimate, interlocked bonding engagement with the walls of the recesses, thus permanently connecting the inner ring members 11 and 12 in their complementary and abutting relation. It is to be noted that the thinned section 15a of ring 15 not only defines a line of fold of the ring but also serves to accommodate the thickening or folding together of the metal between the diverging sides of the ring as the ring is contracted.

It is to be noted, further, that the bearing structure disclosed herein by way of example is of the type to resist thrust as well as axial load, the arcs of the ball races being formed on inclined radii.

While the invention has been disclosed in connection with the illustrated embodiment, it is to be understood that variations and changes in the details of construction may be made without departing from the spirit of the invention. It is desired, therefore, to be limited only as indicated by the scope of the appended claims.

What is claimed is:

1. In a bearing structure having relatively rotatable inner and outer bearing elements at least one of which is a composite ring with a pair of complementary ring members, a lock ring to unite the complementary members into a virtually unitary bearing ring, said lock ring being of soft ductile metal and preformed with a rim of transversely bent shape lending itself to transverse contractile deformation said ring being insertable between adjacent ends of the complementary members into respective recesses in the members and initially spacing the adjacent ends of the members apart, said ring being sufficiently elastic to be sprung into the recesses in the members detachably to hold them prior to deformation of the ring, and the ring being capable of transverse contractile deformation upon the members being pressed closer together so as to produce a flow of metal of the ring rim into intimate interlocked bonding contact with the walls of the recesses for substantially permanently uniting the complementary members.

2. In a bearing structure such as defined in claim 1, said members being formed with cam edges in front of the recesses to facilitate insertion of the lock ring into the recesses.

3. In a bearing structure such as defined in claim 2, said recesses being undercut to provide a component of lateral engagement with the lock ring to restrain detachment of the ring from the recesses.

4. In a bearing structure such as defined in claim 1, said lock ring being preformed intermediate the rim with a weakened section to define a line of fold for the ring during its contractile deformation.

5. In a bearing structure such as set forth in claim 1, in which the composite ring composed of complementary members is the inner bearing ring; said members being formed with internal annular channels or recesses, said lock ring being insertable into these channels and restrained from collapsing into the bores of the members during its contractile deformation, so that the ring rim edges are forced outwardly towards the bottoms of the channels with consequent thickening and flow of the metal of the rim edges into intimate interlocked bond with the walls of the channels.

6. An anti-friction bearing comprising relatively rotatable inner and outer race rings, the inner ring being a composite ring composed of a pair of complementary race ring members, each of these members being formed at corresponding ends with a flat radially extending face and with an internal annular channel behind the flat face, a lock ring of ductile metal but with sufficient elasticity to enable the lock ring to be sprung into the channel of the members to connect them detachably, said lock ring being preformed with a rim of dished or generally V-shaped cross-section, each side of the rim engageable in one of the channels, said rim having a thinned central section to define a line of fold for the rim and to accommodate thickening of the central portion of the rim during transverse contractile deformation of the ring, the transverse span of the ring rim being such that with the rim engaged in the channels for detachably connecting the members, the flat faces of the members are spaced apart in confronting but complementary positions, said lock ring being deformable by transverse contraction upon the members being pressed together to abut their flat faces while restraint is imposed against the inside circle of the lock ring to prevent its collapse into the bores of the members, whereby the rim metal will flow into intimate bonding contact with the walls of the channel, to secure the members with their flat faces in abutment.

7. A lock ring for connecting the complementary race ring members of a composite race ring of an anti-friction bearing, said lock ring being formed of soft, ductile metal and with a rim of initial relatively shallow dished contour, the lock ring being adapted for insertion between the complementary race members and into recesses respectively formed in these parts, said ring rim having an initial transverse span such that upon its insertion in said recesses it holds the facing ends of the complementary members appreciably apart, so that upon these members being pressed together to abut their facing ends the lock ring will undergo transverse contractile deformation with the ring rim being forced into a more acute and V-shaped contour, such contraction of the lock ring to take place while the lock ring is restrained from collapsing radially away from said recesses, whereby the metal of the ring rim will be forced to flow into intimate bonding interlocking contact with the walls of the recesses and the lock ring will unite the complementary members with their facing ends in abutment.

FREDERICK W. RECKNAGEL.

References Cited in the file of this patent

UNITED STATES PATENTS

| Number | Name | Date |
|---|---|---|
| 1,379,945 | Teetsow | May 31, 1921 |
| 1,783,791 | Hughes | Dec. 2, 1930 |

FOREIGN PATENTS

| Number | Country | Date |
|---|---|---|
| 432,925 | Germany | Aug. 17, 1926 |